US006936214B2

(12) United States Patent
Schaffer et al.

(10) Patent No.: US 6,936,214 B2
(45) Date of Patent: Aug. 30, 2005

(54) PROCESS FOR MOVING AN INJECTION UNIT OF AN INJECTION MOLDING MACHINE

(75) Inventors: Werner Schaffer, Loipersbach (AT); Dietrich Wolf, Pottendorf (AT)

(73) Assignee: Battenfeld GmbH, Meinerzhagen (DE)

(*) Notice: Subject to any disclaimer, the term of this patent is extended or adjusted under 35 U.S.C. 154(b) by 261 days.

(21) Appl. No.: 10/198,790

(22) Filed: Jul. 18, 2002

(65) Prior Publication Data

US 2003/0025247 A1 Feb. 6, 2003

(30) Foreign Application Priority Data

Jul. 19, 2001 (DE) .......................... 101 35 125

(51) Int. Cl.[7] .............................................. B29C 45/00
(52) U.S. Cl. ................................. 264/328.11; 425/574
(58) Field of Search ........................ 264/328.1, 328.11; 425/562, 574, 569

(56) References Cited

U.S. PATENT DOCUMENTS

| 5,147,659 A | * | 9/1992 | Watanabe et al. ........... 425/574 |
| 5,303,133 A | * | 4/1994 | Wagner ....................... 362/157 |
| 5,348,463 A | * | 9/1994 | Keitel et al. ................. 425/145 |
| 6,015,281 A | * | 1/2000 | Chikazawa et al. ......... 425/574 |
| 6,432,333 B1 | * | 8/2002 | Emoto ........................ 264/40.5 |

FOREIGN PATENT DOCUMENTS

| DE | 295 04 297.4 | 6/1995 |
| JP | 08318546 | 12/1996 |
| JP | 2000141434 | 5/2000 |

* cited by examiner

Primary Examiner—Jill L. Heitbrink
(74) Attorney, Agent, or Firm—Hamilton, Brook, Smith & Reynolds, P.C.

(57) ABSTRACT

A system and process for producing pressing force of an injection unit of an injection molding machine on a mold, which comprises the steps: a) actuating a linear drive unit to bring an injection device to rest on a mold; a working cylinder unit being supplied with fluid via a store during the axial displacement of the injection device until the required rest position on the mold is reached. Provision is made according to one aspect of the invention in that after reaching the rest position on the mold, a blocking element is closed and the connection within a connection unit is opened, and b) the linear drive unit is further actuated, c) a displacement piston is displaced relative to the hydraulic element, and d) increased pressure is produced in the working cylinder unit via a fluid connection in the hydraulic element to increase the contact pressure of the injection unit on the mold.

2 Claims, 2 Drawing Sheets

PROCESS FOR MOVING AN INJECTION UNIT OF AN INJECTION MOLDING MACHINE

RELATED APPLICATION

This application claims priority under 35 U.S.C. § 119, or 365, to German Application DE 101 35 125.9, filed Jul. 19, 2001, the entire teachings of which are incorporated herein by reference.

BACKGROUND

Processes and devices for moving injection units are generally known. The plastic granules plastified in the injection unit, after they have reached the flowability necessary for injection and temperature necessary for it, are injected into the closed mold at high speed and for this reason also at high pressure. It is therefore necessary to press the nozzle, part of the injection unit, firmly against the mold, so that the plastified plastic composition cannot escape between the nozzle and mold.

In order to increase the contact forces in a hydraulic press, German 295 04 297, proposes to immerse a piston of smaller diameter into the cavity of a larger working cylinder filled with a fluid. The fluid displaced in this manner increases the pressure in the working cylinder and consequently the contact force produced by the working cylinder.

SUMMARY

One aspect of the invention is to offer a process and a device with which to facilitate the required contact force of a nozzle of an injection unit on a mold and the movement of the injection unit via one and the same linear drive.

In accordance with one aspect of the invention, a process for producing pressing force of an injection unit of an injection molding machine on a mold is provided which includes actuating a linear drive unit to bring the injection unit to rest on a mold. A working cylinder unit is supplied with fluid via a store or overflow tank during the axial displacement of the injection device until the required rest position on the mold is reached. After reaching the rest position on the mold, a blocking element or valve is closed and the connection within a connection unit is opened. The linear drive unit is further actuated to displace a piston relative to a hydraulic element to produce an increased pressure in the working cylinder unit via a fluid connection in the hydraulic element to increase the contact pressure of the injection unit on the mold. As a result of these further steps of the process of the invention, a high pressure is produced in the working cylinder and consequently the required nozzle contact force is achieved.

By way of advance, provision is made to control or regulate closing of the blocking element and opening of the connection between a connection element and a supporting element of the connection unit such that the movement of the linear drive unit during the process is constant.

In the device, provision is made according to one aspect of the invention in that the injection unit is connected to the linear drive unit via the connection unit and a displacement piston can be displaced relative to the hydraulic element by means of the linear drive unit to increase the pressure in the working cylinder unit when the connection unit is open and the blocking element is closed. As a result of this embodiment of the device, a high pressure in the working cylinder is produced via one and the same linear drive to achieve the required nozzle contact force.

Provision is made to design the connection between the injection unit and the linear drive unit to be positive in one direction and non-positive in another direction. The blocking element can include an annular sealing element, which can be activated via the displacement piston. However, the blocking element can also be an electrically or mechanically actuatable valve.

A permanent magnet or electromagnet is proposed as a connection element, but it is also conceivable to design the connection element as a spring or cylinder. The required retaining force is determined and planned accordingly or in the case of an electromagnet activated or released via machine control.

The linear drive unit can be formed from an electromotor, a gear, and a worm drive.

By way of further development, provision is made to form the linear drive unit from at least one of an electromotor, a gear with provided pinion, and a toothed rack. A further design variant produces the linear drive unit as an electrical linear drive.

BRIEF DESCRIPTION OF THE DRAWINGS

The foregoing and other objects, features and advantages of the invention will be apparent from the following more particular description of various embodiments of the invention, as illustrated in the accompanying drawings in which like reference characters refer to the same parts throughout the different views. The drawings are not necessarily to scale, emphasis instead being placed upon illustrating the principles of the invention.

BRIEF DESCRIPTION OF THE INVENTION

A description of various embodiments of the invention follows.

Figure 1:
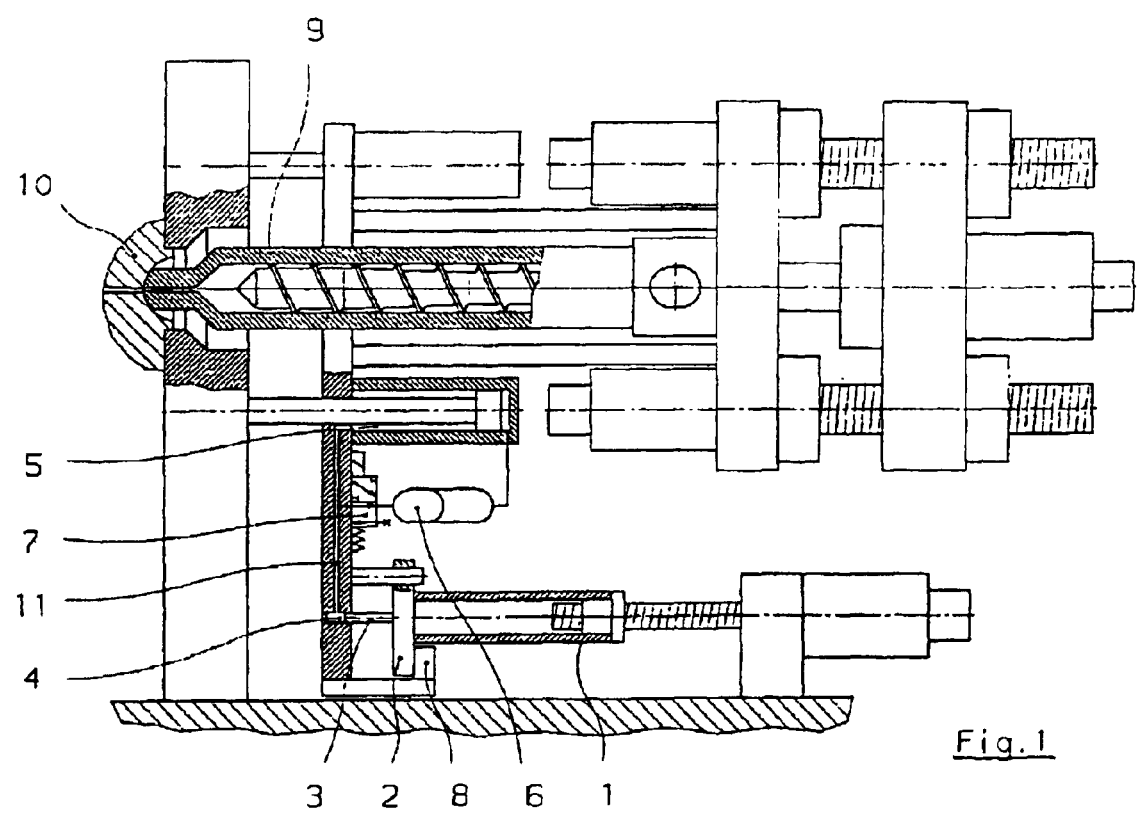
FIG. 1 shows the injection unit resting on the mold before the high-pressure phase.

In FIG. 1, the injection unit 9, rests on the mold 10 which is stationary. The injection unit 9, is connected positively and non-positively to the linear drive unit 1, which is also stationary, via the connection unit 2, 8, and has been brought to rest on the mold 10 via the latter. During this procedure, the store 6, the working cylinder unit 5, the blocking element 7, and the hydraulic element 4 were also displaced, since a non-positive connection exists between the supporting element 2, and the connection element 8, i.e., a connection is maintained at connection unit 2, 8, for example, by magnetic force. A positive connection exists when the injection unit 9, is raised from the mold 10, that is, the linear drive unit 1 rotates in the opposite direction to move the injection unit 9, to the right. The working cylinder unit 5, the blocking element 7, and the hydraulic element 4, are also drawn here regardless of the connection at connection unit 2, 8.

As soon as the injection unit 9, has reached the position shown, the blocking element 7, or valve is closed and the connection in the connection unit 2, 8, opened. That is, the connection element 8, here an electromagnet, is connected without current via machine control and releases the supporting element 2. The linear drive unit 1, is further actuated and displaces the displacement piston 3, relative to the hydraulic element 4. As a result of this relative movement, a fluid, for example hydraulic oil, is displaced via the fluid connection 11, in the hydraulic element 4. Since the fluid connection 11 extends into the working cylinder unit 5, the pressure in the latter is increased and consequently the contact force of the injection unit 9, on the mold 10, is increased.

Figure 2:
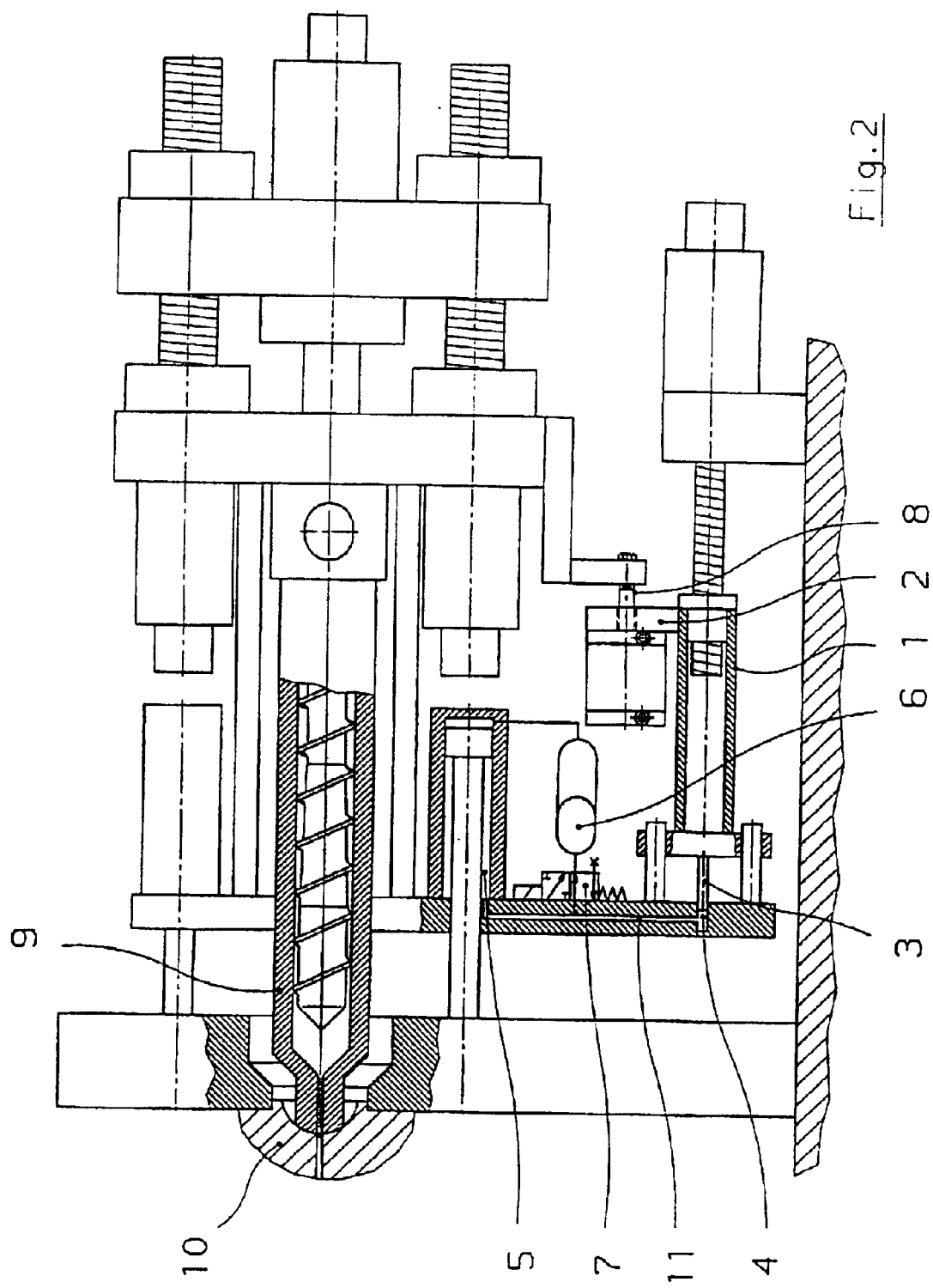
FIG. 2 shows FIG. 1 with a different position of the connection unit.

FIG. 2 differs from FIG. 1 in that the connection unit 2, 8 is not arranged on the head of the linear drive unit 1 and is connected to the injection unit 9 via the hydraulic element 4, but here the supporting element 2 is attached to the cylindrical wall of the worm drive of the linear drive unit 1 and the connection element 8 to the support of the injection unit 9. A cylinder, which releases its retaining force after reaching the rest position of the injection unit 9 on the mold 10 and facilitates a movement of the supporting element 2 relative to the injection unit 9, is selected here as connection element 8.

The design of the device and the process makes it possible to bring an injection unit to rest on a mold with a linear drive unit and to produce the required contact force on this mold with the same linear drive unit.

While this invention has been particularly shown and described with references to various embodiments thereof, it will be understood by those skilled in the art that various changes in form and details may be made therein without departing from the scope of the invention encompassed by the appended claims.

What is claimed is:

1. Process for producing pressing force of an injection unit of an injection molding machine on a mold, the process including:

a) actuating a linear drive unit to bring the injection unit to rest on a mold, a working cylinder unit being supplied with a fluid via a store during the axial displacement of the injection device until the required rest position on the mold is reached, after reaching the rest position on the mold, a blocking element is closed to block passage of the fluid into the store during further actuating and a connection element within a connection unit is opened to release a supporting element of the connection unit thereby allowing for displacement of the fluid during further actuating; and b) further actuating the linear drive unit to displace a displacement piston relative to a hydraulic element to produce an increased pressure in the working cylinder unit via a fluid connection in the hydraulic element to increase the contact pressure of the injection unit on the mold.

2. Process according to claim 1, wherein closing of the blocking element and opening of the connection between a connection element and a supporting element of the connection unit are controlled or regulated such that the movement of the linear drive unit between process step a) and process step b) is constant.

* * * * *